Patented Oct. 25, 1949

2,486,177

UNITED STATES PATENT OFFICE 2,486,177

STABILIZED FATS AND OILS

John Korner, Philadelphia, Pa., assignor to Silmo Chemical Corporation, Vineland, N. J., a corporation of New Jersey No Drawing. Application February 11, 1947, Serial No. 727,941

1 Claim. (Cl. 99—163)

This invention relates to the stabilization against oxidation of organic materials including glyceride oils, and vitamin A and carotene, and to novel salts for effecting such stabilization, and is herein illustrated in considerable detail as embodied in stabilized oils and stabilized vitamin A and stabilized carotene and stabilized glycol and compounds of similar chemical composition.

Many efforts have been made to produce a palatable vitamin A material which would be non-toxic, and to produce a palatable stabilized carotene, and to stabilize to the same end glyceride oils, including butter and lard. Such efforts have extended to the materials when used for animal feeds, such as poultry feed, and some of the food materials have been much improved.

Some such food materials have deteriorated rapidly by oxidation of the contained vitamin, on the one hand, and by the turning rancid of any oil carrier, on the other hand. Thus, it has hitherto been impossible for a manufacturer of goods carrying vitamin A, for example, to guarantee a given potency to the consumer without shipping out goods which carry a large excess of the vitamin to cover possible losses by oxidation before the goods are used.

The value of that wasteful excess represented many times the normal profit on the goods shipped. Thus, the consumer has had to pay excessive prices for dependable goods. Moreover, it has been found that the best stabilizers for one type of oxidizable material were not always the best for another type of oxidizable material.

It has been proposed to stabilize vitamin A and glyceride oils with added hydro-quinone and similar compounds but that has been demonstrated to be somewhat hazardous to health and as not being completely satisfactory with all oils and other easily oxidized material.

Some gallates have been used and have proven useful within narrow limits but still unsatisfactory. In prior Patent No. 2,394,456 has been described the stabilization of vitamin A with a gallate in the presence of a synergistic material. N-propyl gallate has been used as a stabilizer for some materials, but has proved useless with carotene.

According to the present invention, revolutionary results are obtained by incorporating ammonium gallate, or, better still, certain substituted ammonium gallates, in glyceride oils and other food and other materials. Many, perhaps all, of these novel gallates are non-toxic, and some of them, for reasons not yet explained, actually reduce the initial amounts of peroxide present when the gallate is added to the peroxide-containing material.

Moreover, some of the stabilizing materials, such as morpholonium gallate, were highly effective anti-oxidants for stabilizing carotene, on which n-propyl gallate, for example, had no stabilizing effect.

It will be noted that the substituted ammonia groups in the table below all include an oxygen in or at the end of a carbon chain, usually as a hydroxyl, and that there are at least two and not more than four carbons between the oxygen and the N of the substituted ammonia.

Some of the principal compounds tested in the reports below seemed to have the structural formulas set below their names:

Morpholonium gallate:

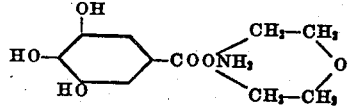

2-methyl-1-propanol-2-ammonium gallate:

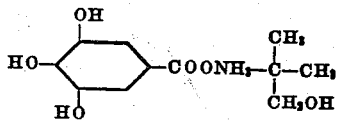

2-methyl, 1-3 propandiol-2-ammonium gallate:

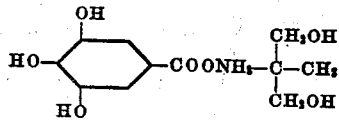

Mono-ethanol-ammonium gallate:

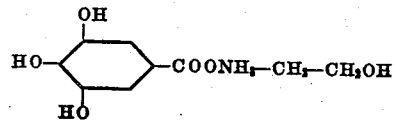

Di-ethyl-ethanol-ammonium gallate:

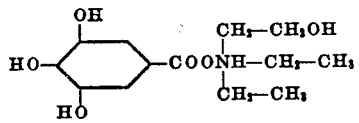

Ammonium gallate:

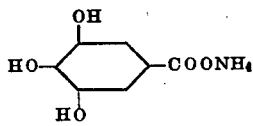

Di-methyl-ethanol-ammonium gallate:

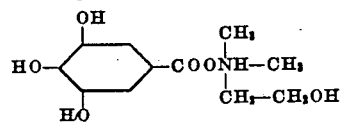

Tri-ethanol-ammonium gallate:

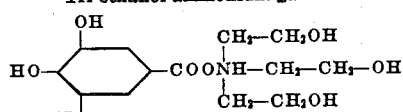

The foregoing and other substituted ammonium gallates are widely useful, but are subject to certain limitations. Thus, ammonium gallate is so nearly insoluble in most glyceride oils, even when hot, and must be added in solution in a volatile solvent. Even then, a test showed only 0.081% remained in solution. That proportion proved useful. It was readily soluble in numerous volatile organic and inorganic solvents.

The substituted ammonium gallates tested dissolved readily in hot oil and about 0.05% remained in solution when cold and were effective in that proportion.

Some of the substituted ammonium gallates seemed more soluble in the oils when added by dissolving in hot oil than when added in alcohol-ether solution. It seemed likely that the hot oil converted such gallates to the corresponding amides. It was found that amides were soluble in the oils and were relatively more effective in stabilizing the oil than were some of the substituted ammonium gallates.

It may be mentioned that ammonium gallate is much more soluble in oils carrying water, say 1% or more, but oils carrying water also oxidize much more easily.

The substituted ammonium gallate, morpholonium gallate, was open to none of the foregoing objections to ammonium gallate, and was additionally valuable in that it was an almost infallible antioxidant when added to beta carotene.

Amino-ethyl-ethanol-ammonium gallate was also superior in many respects to any of the other substituted ammonium gallates.

In the examples reported below, the oils and other materials tested for protection against oxidation, unless otherwise stated, carried 0.1% of the antioxidant named, thus insuring that at least the 0.05% soluble was probably in solution.

Dog shark liver oil carrying 0.081% ammonium gallate (added in solution in hot alcohol-ether mixture) was tested by accelerated methods by bubbling oxygen through it at a temperature of 97° C. to 98° C. for four and one-half hours. That test far exceeded any oxidation which would result in months of commercial practice, and yet the oil at the end of the test retained more than 90% of its vitamin potency.

A control sample in the same period lost 90% of its vitamin potency.

According to the present invention, mono-ethanol ammonium gallate (a hitherto unknown salt), properly prepared, has been found to be non-toxic, to be more effective as a stabilizer than any other hitherto known material, and to be produced at such cost that it is commercially useful. The formula may be written

It need not, however, be used chemically pure.

The tests below of mono-ethanol ammonium gallate as a stabilizing material made on certain well known glyceride oils which are very easily tested have proved to be parallel to analogous tests tried out on vitamin A and much more satisfactory than tests on vitamin A in that they can be carried out in a reasonable length of time and do not involve the problems involved in biological feeding tests. Some of the tests of oil-carrying vitamin A are included below.

The mono-ethanol ammonium gallate was prepared by heating about 94 grams of gallic acid in methyl alcohol in an inert atmosphere of nitrogen under a reflux condenser until completely dissolved. The solution was transferred to a liter flask, having three necks fitted with a mercury sealed stirrer, an inlet and an outlet for gas, and a dropping funnel containing about 36 grams of mono-ethanol amine dissolved in 50 cc. of methyl alcohol. This gave a theoretical excess of the ethanol amine. After the air had been completely replaced by the nitrogen, the ethanol amine was dropped in about 1 drop every 2 seconds, while the solution was continuously heated on an oil bath. After a short time a voluminous precipitate began to fall, increasing as the reaction went on. The methyl alcohol solution became lighter. After the last of the ethanol amine had been added, the solution was heated for 10 more minutes and allowed to cool and filtered through a Buchner funnel. The precipitate was dried, by passing nitrogen through it, and then consisted of white prismatic needles. These were further purified by being dissolved in boiling methyl alcohol and precipitated out by the addition of benzene. The product weighed 109 grams and was soluble in hot oil. Ethyl alcohol could replace the methyl alcohol.

About 0.1% of the mono-ethanol ammonium gallate thus obtained was added to the fatty material lard, having an initial peroxide value of 1.7. This sample and other samples named below were artificially oxidized at an accelerated rate to form peroxides by bubbling air through them at a given controlled rate and temperature.

At the end of 2 hours the peroxide value had dropped to 0.5. At the end of 5 hours it had only risen slightly to 0.7. At the end of 8 hours it had risen to 0.9. At the end of 15 hours it had risen to 2.2.

A blank test under the same conditions at the end of 2 hours gave a peroxide value of 161.2.

Mono-ethanol ammonium gallate was incorporated into butter, having a peroxide value of zero and blown in the same way to create peroxides. At the end of 3 hours the peroxide value of the sample had increased to 0.1, at the end of 19 hours to 0.2 and at the end of 35 hours to 0.3. A corresponding blank test on the same butter showed a peroxide value of 253.5 at the end of 19 hours. A similar test of olive oil showed that it was completely stabilized by the addition of the same amount of mono-ethanol ammonium gallate for at least 24 hours, whereas under the same conditions amino ethanol gallate showed a decided increase in 24 hours.

The hydro-quinone test showed a peroxide value of 308.0 at the end of 24 hours.

In the foregoing, all peroxide values were determined according to the Wheeler method in Swift aeration tubes.

Under parallel conditions a standard cod liver oil with an initial peroxide value of 3.0 carrying 0.1% of mono-ethanol ammonium gallate, showed a peroxide value of 2.3 at the end of 1 hour, of 3.1 at the end of 2 hours, of 5 at the end of 3 hours, and of 6.6 at the end of 4 hours.

In a parallel 4 hour test of the same oil carrying hydro-quinone the peroxide value rose to 71.1. It also rose much higher for oil carrying the other gallates named above.

A parallel test of vitamin loss under the same conditions, yielded the following on a cod liver oil having an initial vitamin potency of 2110:

VITAMIN A DETERMINATION

| Antioxidant | 1 hr. | 2 hrs. | 3 hrs. | 4 hrs. |
|---|---|---|---|---|
| Mono-ethanol ammonium gallate | 2,100 | 2,100 | 2,090 | 2,090 |
| Hydro-quinone | 1,940 | 1,930 | 1,880 | 1,780 |
| Blank | 1,320 | 1,200 | | |

Study of results showed that the four-hour accelerated tests exceeded the severity needed for determining commercial stability, and that a shorter period of bubbling with a milder oxidant, such as air, was a fairer test of commercial utility.

The following test showing increased peroxide values was carried out by bubbling air at a controlled rate under standardized conditions through Argentine shark liver oil having an initial peroxide value of 0.4.

PEROXIDE VALUES

| Antioxidant | ½ hr. | 1 hr. | 1½ hrs. | 2 hrs. |
|---|---|---|---|---|
| 0.1% Mono-ethanol ammonium gallate | 1.7 | 2.8 | 3.8 | 5.8 |
| 0.1% Mono-eth.ammo.gall.tech. | 1.9 | 2.8 | 3.7 | 4.8 |
| 0.1% Hydro-quinone | 6.5 | 7.4 | 10.1 | 10.8 |
| Blank | 8.2 | 12.1 | 17.1 | 20.4 |

Even more remarkable stabilizing qualities of mono-ethanol ammonium gallate are shown in the following table of relative loss of vitamin potency of the Argentine shark liver oil carrying 0.1% of stabilizing agents, when the oil had an initial potency of 28,080. The test conditions were bubbling air through the stabilized oil under the same standardized conditions.

| Antioxidant | Units p./gm. Vitamin A assays | | | | | |
|---|---|---|---|---|---|---|
| | ½ hr. | Per Cent Loss | 1 hr. | Per Cent Loss | 2 hrs. | Per Cent Loss |
| 0.1% Mono-ethanol ammon. gallate | 27,800 | 0.996 | 27,800 | 0.996 | 27,500 | 2.06 |
| 0.1% Hydro-quinone | 26,700 | 4.91 | 26,300 | 6.34 | 24,900 | 11.34 |
| Blank | 25,900 | 7.76 | 25,400 | 9.54 | 20,640 | 26.5 |

It will be noted that the loss of vitamin potency was almost negligible when it carried mono-ethanol ammonium gallate.

It is possible, but usually unprofitable commercially to substitute higher alkyl groups for the ethanol, such as propanol.

It will be further noted that the mono-ethanol ammonium gallate need not be more than what is commonly called technically pure as distinguished from chemically pure.

The results of tests on oils and vitamin A with various substituted ammonium gallates gave the results indicated below. In most cases the antioxidant was dissolved in the oil by heating the oil or heating part of the oil and dissolving in that and then mixing with the rest of the oil, the antioxidant being much more soluble in the hot oil than in cold. Ammonium gallate could not thus be dissolved, and it was admixed by dissolving in ether and alcohol (or other suitable solvent) and added to the oil. As nearly as could be measured only about 0.081% of ammonium gallate remained in solution, any excess over this being precipitated out.

The effectiveness of the various substituted ammonium gallates as antioxidants for the inhibiting peroxide formation varied with the kind of oil with which the gallate was admixed.

Thus, with peanut oil, amino-ethyl-ethanol-ammonium gallate and mono-ethanol-ammonium gallate were highly effective. They kept the peroxide value of an oil initially with value 0.6 down to 1.5 in a 6½ hour accelerated test, whereas a blank rose to 10.9 in two hours, and to 26.9 in four hours.

In order to illustrate the antioxidant effects of the various gallic acid ammonium compounds on the oils, on vitamin A, and on glycol, tests were systematically made under standardized conditions summarized above so as to be closely comparable.

Lard with an initial peroxide value of 2.3 was tested for 1, 3 and 5 hours by bubbling the oxygen, with the results indicated for the various antioxidants carried by it.

| Sample | Antioxidant Used | Peroxide number | | |
|---|---|---|---|---|
| | | 1 hour | 3 hours | 5 hours |
| #1 | Morpholonium gallate | 2.5 | 2.7 | 2.9 |
| #2 | Tris (hydroxy-methyl) ammonium methane gallate. | 3.4 | 3.8 | 3.8 |
| #3 | 2-ammonium-2-methyl-1-propanol gallate. | 2.5 | 2.7 | 2.7 |
| #4 | 2-methyl-1,3-propanediol-2-ammonium gallate. | 2.5 | 2.6 | 2.7 |
| #5 | Mono-ethanol-ammonium gallate. | 2.7 | 2.7 | 2.7 |
| #6 | Hydroquinone | 3.4 | 4.2 | 4.5 |
| #7 | Blank | 4.2 | 100 | |
| #8 | Mono-ethanol-ammonium gallate c. p. | 2.8 | 2.9 | 3.4 |
| #9 | Di-ethyl-ethanol-ammonium gallate. | 2.8 | 2.9 | 3.4 |
| #10 | Amino-ethyl-ethanol-ammonium gallate. | 2.6 | 2.9 | 3.0 |
| #11 | Gallic acid ethanol amide | 3.2 | 3.7 | 3.8 |
| #12 | Ammonium gallate (solvent used). | 3.0 | 3.6 | 3.8 |
| #13 | Di-methyl-ethanol-ammonium gallate. | 3.0 | 3.3 | 3.6 |
| #14 | Tri-ethanol-ammonium-gallate (solvent used). | 3.4 | 4.0 | 4.2 |

Initial peroxide value, 2.3. Material used: lard.

Using the same antioxidants, dissolved in hot oil, (except for ammonium gallate and tri-ethanol ammonium gallate) a dog fish liver oil yielded the following results, with a starting peroxide number of 1.4 and a vitamin A potency of 21,000 units p./gm. It will be noted that contrary to previous experience some of the gallates, such as 2-ammonium-2-methyl-1-propanol gallate, were especially effective in preventing peroxide formation, while another, tris (hydroxy-methyl) ammonium methane gallate, was relatively more effective in stabilizing vitamin A. The results follow (using the same identifying numbers):

| Sample | 1 hour | | 3 hours | | 5 hours | |
|---|---|---|---|---|---|---|
| | Peroxide No. | Vitamin A potency | Peroxide No. | Vitamin A potency | Peroxide No. | Vitamin A potency |
| #1 | 1.5 | 20,600 | 2.2 | 20,150 | 3.5 | 19,450 |
| #2 | 2.5 | 20,800 | 4.1 | 20,600 | 10.0 | 19,150 |
| #3 | 1.7 | 20,400 | 2.4 | 19,350 | 3.5 | 18,700 |
| #4 | 1.7 | 20,600 | 2.5 | 19,800 | 4.0 | 19,200 |
| #5 | 1.7 | 19,650 | 2.4 | 19,250 | 2.7 | 19,100 |
| #6 | 5.0 | 19,450 | 7.3 | 18,750 | 10.7 | 17,550 |
| #7 | 23.3 | 14,300 | | 1,835 | | |
| #8 | 1.3 | 20,300 | 2.7 | 20,100 | 3.7 | 19,900 |
| #9 | 2.1 | 20,700 | 2.8 | 20,600 | 3.5 | 20,000 |
| #10 | 1.3 | 21,100 | 1.7 | 20,100 | 1.9 | 20,000 |
| #11 | 2.4 | 21,000 | 4.1 | 20,700 | 6.2 | 19,700 |
| #12 | 3.2 | 21,200 | 6.0 | 20,200 | 17.5 | 17,800 |
| #13 | 2.1 | 21,000 | 2.8 | 19,900 | 4.7 | 19,200 |
| #14 | 5.8 (in solvent) | 20,800 | 9.7 | 19,800 | 56.0 | 2,650 |

The tests were actually run further, but the five-hour test exceeded commercial conditions and the further results were of mere academic interest.

Parallel tests with olive oil with an initial peroxide value of 3.3 showed that all the above enumerated substituted ammonium gallates, except tris (hydroxy-methyl) ammonium methane gallate and tri-ethanol-ammonium-gallate, actually reduced the peroxide number of the oil at least during the first hour of the test.

The ammonium gallate and the gallic acid mono-ethanol-amide, on the contrary, permitted some rise in the peroxide number.

One parallel test on a vitamin A concentrate having a potency of 277,000 units per gram showed ammonium gallate far superior as antioxidant to other materials tested.

It was also markedly superior to all other materials tested in preserving the potency of a dog shark liver oil having a starting potency of 21,240 units of A vitamin per gram.

It was highly effective in preventing peroxide formation in a dog shark liver oil having an initial peroxide value of 1.7, but not quite equal to mono-ethanol-ammonium gallate in reducing the peroxide number of a similar oil having the high peroxide number of 2.7, although both were highly effective with this last named oil.

The ammonium gallate and the substituted ammonium gallates were also highly effective antioxidants for other substances than glyceride oils. The following table shows the stabilizing effect of these salts on ethylene glycol kept three weeks under normal conditions, the last column giving the peroxide values, and the gallate numbers referring to the corresponding gallates in the lard table above:

| Sample | Peroxide Number | Sample | Peroxide Number |
|---|---|---|---|
| #1 | 0.7 | #8 | 1.0 |
| #2 | 0.6 | #9 | 1.2 |
| #3 | 0.8 | #10 | 0.0 |
| #4 | 0.8 | #11 | 0.7 |
| #5 | 1.0 | #12 (in solvent) | 0.7 |
| #6 | 0.8 | #13 | 1.0 |
| #7 | 6.8 | #14 (in solvent) | 0.7 |

Beta carotene with a starting assay of 3040 units was tested as described above, as in the table below, for stabilization by morpholonium gallate, amino-ethyl-ethanol-ammonium gallate and mono-ethanol ammonium gallate.

| Antioxidant | Units p./gm. Beta carotene assays | | | |
|---|---|---|---|---|
| | 5½ hrs. | Percent Loss | 7½ hrs. | Percent Loss |
| Morpholonium gallate | 2,340 | 23.1 | 1,640 | 46.1 |
| Amino-ethyl-ethanolammonium gallate | 2,270 | 25.4 | 1,520 | 50.0 |
| Mono-ethanol ammonium gallate | 2,180 | 28.3 | 1,200 | 60.6 |

In the same test, n-propyl gallate proved useless yielding the same result as a blank sample.

In another type of test, in which the material tested was stored for 142 hours under a pressure of 100 lbs. per square inch of oxygen, carotene carrying morpholonium gallate showed no measurable loss of strength at the end of twenty two days, or even at the end of thirty seven days. Carotene carrying amino-ethyl-ethanol-ammonium gallate (no solvent used) showed a loss of only 1.7% in twenty two days, and carotene carrying mono-ethanol-ammonium gallate (no solvent used) showed a loss of only 2.6% in twenty two days.

Having thus described certain embodiments of the invention in some detail, what is claimed is:

A material susceptible to deleterious oxidation selected from the group consisting of glyceride oils carrying vitamin A and glyceride oils carrying provitamin carotene, and selected from the group consisting of butter, lard, olive oil, peanut oil and liver oil, and carrying an effective amount not exceeding a fraction of a per cent of a gallate selected from the group consisting of ammonium gallate and substituted ammonium gallates in which every substituent group consists of an aliphatic chain of carbon atoms not more than four in number, each carbon having all valences satisfied and connected only to the nitrogen of the ammonia or to carbon or hydrogen or hydroxyl oxygen.

JOHN KORNER.

REFERENCES CITED

The following references are of record in the file of this patent:

UNITED STATES PATENTS

| Number | Name | Date |
|---|---|---|
| 2,209,314 | Baker | July 30, 1940 |
| 2,267,224 | Taylor et al. | Dec. 23, 1941 |

OTHER REFERENCES

Bergel-Chem. & Ind., April 1944, pages 127–128.